(12) United States Patent
Toyama et al.

(10) Patent No.: US 11,872,790 B2
(45) Date of Patent: Jan. 16, 2024

(54) RESIN SHEET HAVING HAIR-LIKE BODIES AND MOLDED ARTICLE THEREOF

(71) Applicant: DENKA COMPANY LIMITED, Tokyo (JP)

(72) Inventors: Hiroko Toyama, Tokyo (JP); Keishi Maeda, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 27 days.

(21) Appl. No.: 17/440,808

(22) PCT Filed: Mar. 25, 2020

(86) PCT No.: PCT/JP2020/013374
§ 371 (c)(1),
(2) Date: Sep. 20, 2021

(87) PCT Pub. No.: WO2020/196638
PCT Pub. Date: Oct. 1, 2020

(65) Prior Publication Data
US 2022/0184917 A1      Jun. 16, 2022

(30) Foreign Application Priority Data

Mar. 26, 2019   (JP) .................................. 2019-059050

(51) Int. Cl.
*B32B 3/30*       (2006.01)
*B29C 48/00*     (2019.01)
(Continued)

(52) U.S. Cl.
CPC ............ *B32B 3/30* (2013.01); *B29C 33/3842* (2013.01); *B29C 48/002* (2019.02); *B29C 48/08* (2019.02);
(Continued)

(58) Field of Classification Search
CPC ..... Y10T 428/24355; Y10T 428/24364; Y10T 428/24479; Y10T 428/2457;
(Continued)

(56) References Cited

U.S. PATENT DOCUMENTS

2003/0208888 A1* 11/2003 Fearing .................. C09J 7/00
                                                                    24/442
2007/0087186 A1*  4/2007 Clarke ................. B29C 59/022
                                                                    428/323
(Continued)

FOREIGN PATENT DOCUMENTS

CA      2 324 313 A1      9/1999
CN      102325643 B       9/2014
(Continued)

OTHER PUBLICATIONS

Jun. 16, 2020 International Search Report issued in International Patent Application No. PCT/JP2020/013374.
(Continued)

*Primary Examiner* — Z. Jim Yang
(74) *Attorney, Agent, or Firm* — Oliff PLC

(57) ABSTRACT

A resin sheet having hair-like bodies arranged regularly on at least one surface of a base layer containing a thermoplastic resin, the surface with the hair-like bodies having a coefficient of friction, as measured according to KES, of 0.5 or more and 1.0 or less, a deviation of the coefficient of friction, as measured by KES, of 0.010 or more and 0.025 or less, and a deviation of roughness, as measured by KES, of 0.2 or more and 1.5 or less.

7 Claims, 6 Drawing Sheets

(51) Int. Cl.
  *B29C 48/08* (2019.01)
  *B29C 48/21* (2019.01)
  *B29C 33/38* (2006.01)
  *B29C 59/04* (2006.01)
  *B32B 7/12* (2006.01)
  *B32B 27/08* (2006.01)
  *B29K 75/00* (2006.01)
  *B29L 7/00* (2006.01)

(52) U.S. Cl.
  CPC .............. *B29C 48/21* (2019.02); *B29C 59/04* (2013.01); *B32B 7/12* (2013.01); *B32B 27/08* (2013.01); *B29K 2075/00* (2013.01); *B29L 2007/002* (2013.01); *B32B 2307/538* (2013.01); *B32B 2439/00* (2013.01); *B32B 2457/00* (2013.01); *B32B 2605/003* (2013.01)

(58) Field of Classification Search
  CPC ..... Y10T 428/24587; Y10T 428/24612; B60R 13/02–0275; B29L 2031/3005–3041; B81C 1/00444; B81C 1/0046; B81C 1/00111; B29C 2059/023; B29C 2043/025; B32B 27/00; B32B 27/36; B32B 27/365; B32B 27/40; C09D 175/04; C09D 175/06
  See application file for complete search history.

(56) References Cited

U.S. PATENT DOCUMENTS

| | | |
|---|---|---|
| 2009/0196058 A1 | 8/2009 | Ishida et al. |
| 2010/0261852 A1* | 10/2010 | Masubuchi ............ C08G 18/44 525/454 |
| 2011/0300339 A1* | 12/2011 | Ho ........................ B29C 39/026 428/156 |
| 2012/0237730 A1* | 9/2012 | Sitti ........................ B82Y 40/00 427/532 |
| 2012/0319320 A1* | 12/2012 | Sitti ........................ B29C 39/42 264/129 |
| 2018/0050484 A1 | 2/2018 | Rocha |
| 2019/0283301 A1 | 9/2019 | Fujiwara et al. |
| 2020/0215787 A1 | 7/2020 | Fujiwara et al. |
| 2020/0247016 A1* | 8/2020 | Calafiore .............. B29C 33/424 |
| 2020/0263032 A1* | 8/2020 | Watanabe ............... C08L 75/04 |
| 2020/0368956 A1 | 11/2020 | Maeda et al. |
| 2021/0268543 A1* | 9/2021 | Piotrowicz .............. A61L 31/16 |
| 2022/0024378 A1* | 1/2022 | Yang ........................ B60Q 3/14 |

FOREIGN PATENT DOCUMENTS

| | | |
|---|---|---|
| EP | 1 564 828 A2 | 8/2005 |
| EP | 3 431 284 A1 | 1/2019 |
| JP | 2002-506753 A | 3/2002 |
| JP | 2005-228911 A | 8/2005 |
| JP | 2007-246122 A | 9/2007 |
| JP | 2009-184421 A | 8/2009 |
| JP | 2014-101606 A | 6/2014 |
| JP | 2017-029608 A | 2/2017 |
| WO | 2010/078134 A1 | 7/2010 |
| WO | 2017/159678 A1 | 9/2017 |
| WO | 2018/016562 A1 | 1/2018 |
| WO | 2019/049897 A1 | 3/2019 |
| WO | 2019/146635 A1 | 8/2019 |

OTHER PUBLICATIONS

Mar. 3, 2022 extended Search Report issued in European Patent Application No. 20777016.5.

* cited by examiner

RESIN SHEET HAVING HAIR-LIKE BODIES AND MOLDED ARTICLE THEREOF

TECHNICAL FIELD

The present invention pertains to a resin sheet having hair-like bodies and a molded article thereof.

BACKGROUND

Conventionally, sheets of paper and polymer materials are used as interior materials of automobiles and the housings of associated components, housings of electronic devices and home appliances, building materials such as wallpaper, housings for toys and game consoles, and members of daily commodities. Moreover, as a method to provide a good tactile sensation to a surface of a sheet, Patent Document 1, for example, presents a resin sheet having hair-like bodies arranged regularly on a surface thereof.
Patent Document 1: WO 2018/016562 A

SUMMARY OF INVENTION

Technical Problem

Meanwhile, there are demands for the provision of sheets having particular tactile sensations according to uses thereof.

The objective of the present invention is to provide a resin sheet expressing a particular tactile sensation and a molded article thereof.

Solution to Problem

That is, as a result of examining various means, the present inventors discovered that for resin sheets having hair-like bodies regularly arranged on at least one surface of a base layer comprising a thermoplastic resin, a particular tactile sensation is expressed by adjusting the surface with the hair-like bodies to have a coefficient of friction, as measured according to KES, of 0.5 or more and 1.0 or less, a deviation of the coefficient of friction, as measured according to KES, of 0.010 or more and 0.025 or less, and a deviation of roughness, as measured according to KES, of 0.2 or more and 1.5 or less, leading to the completion of the present invention.

The present invention, which solves the above problem, is configured as follows.

(1) A resin sheet having hair-like bodies arranged regularly on at least one surface of a base layer containing a thermoplastic resin, the surface with the hair-like bodies having a coefficient of friction, as measured according to KES, of 0.5 or more and 1.0 or less, a deviation of the coefficient of friction, as measured by KES, of 0.010 or more and 0.025 or less, and a deviation of roughness, as measured by KES, of 0.2 or more and 1.5 or less.

(2) The resin sheet according to (1), wherein the hair-like bodies have an average height of 30 μm or more and 500 μm or less, an average diameter of 1 μm or more and 50 μm or less, and an average spacing, between the hair-like bodies, of 20 μm or more and 200 μm or less.

(3) The resin sheet according to (1) or (2), wherein the deviation of roughness, as measured according to KES, is 0.22 or more and 1.0 or less.

(4) The resin sheet according to any one of (1) to (3), wherein the surface with the hair-like bodies has a ratio (MIU/MMD) between the coefficient of friction, as measured according to KES, and the deviation of the coefficient of friction, as measured according to KES, of 40 or more and less than 55.

(5) The resin sheet according to any one of (1) to (4), wherein the hair-like bodies and the base layer have a color difference $\Delta E$ of 10 or less before and after testing upon 500 hours of irradiation at a black panel temperature of 63° C. and an irradiance of 60 $W/m^2$ using a xenon lamp-type accelerated weather resistance tester.

(6) The resin sheet according to any one of (1) to (5), wherein the thermoplastic resin contains a polycarbonate-based urethane-based elastomer.

(7) A molded article of the resin sheet according to any one of (1) to (6).

(8) The molded article according to (7), wherein the molded article is a stationery member.

(9) The molded article according to (7), wherein the molded article is vacuum pressure molded on a surface of an automobile interior material, an electronic device, an electronic device cladding, a cosmetic container, or a container member.

Effects of Invention

According to the present invention, a sheet expressing a particular tactile sensation can be provided.

DESCRIPTION OF EMBODIMENTS

Figure 1:
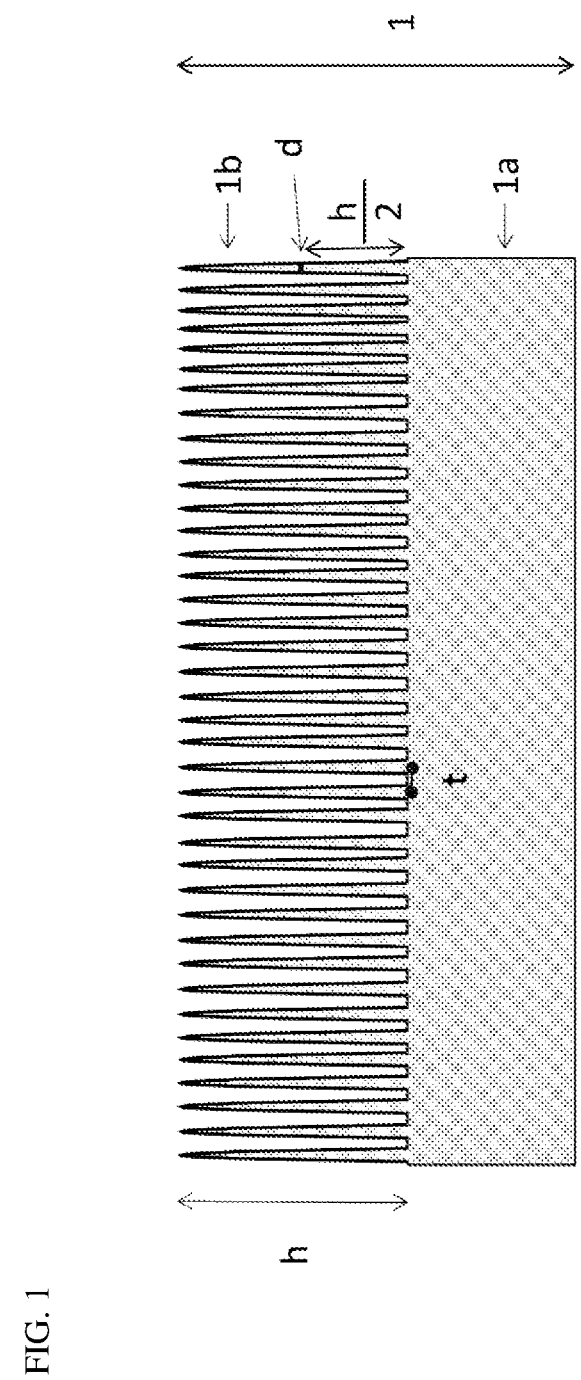
FIG. 1 is a vertical side cross-sectional schematic view showing a resin sheet according to a first embodiment of the present invention.
Figure 2:
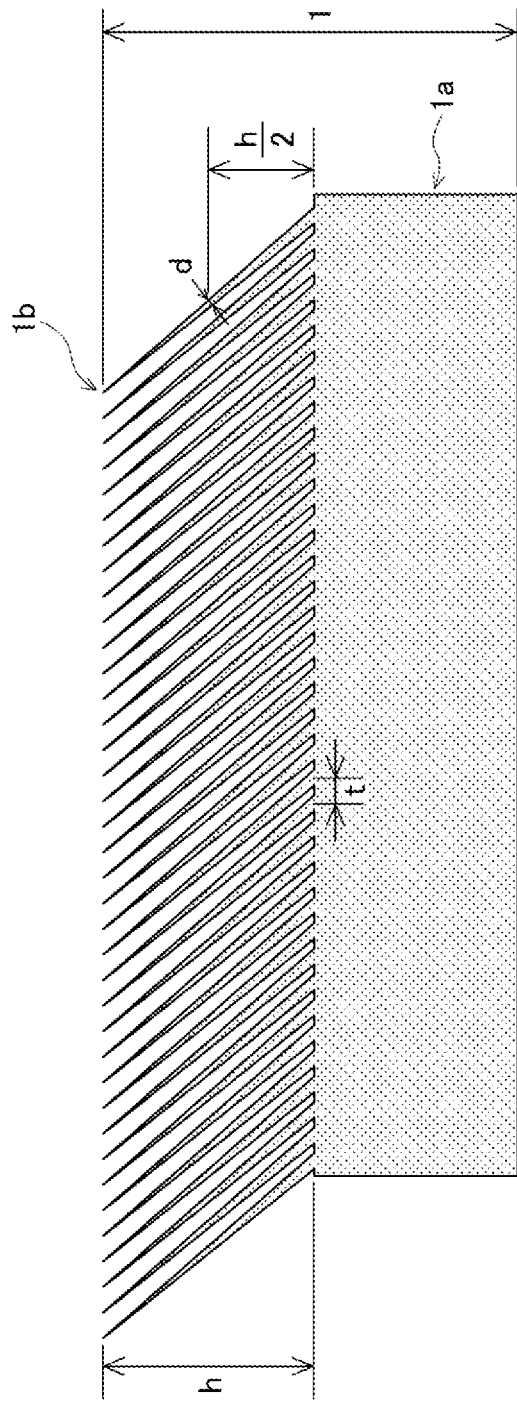
FIG. 2 is a vertical side cross-sectional schematic view showing a variation of the resin sheet according to the first embodiment of the present invention.
Figure 3:
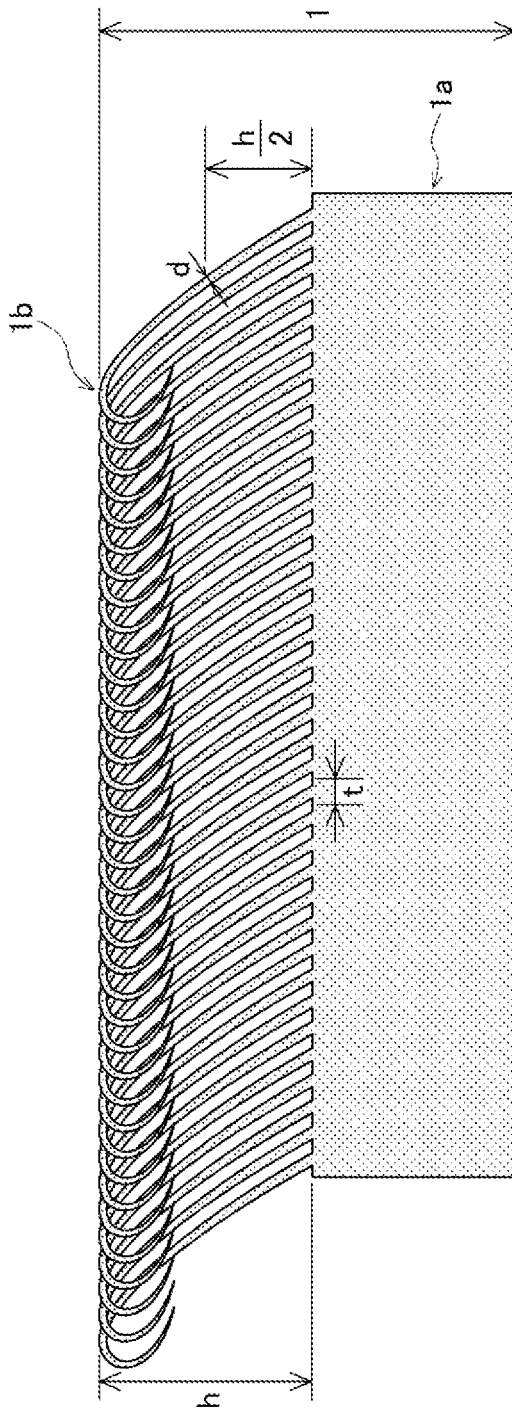
FIG. 3 is a vertical side cross-sectional schematic view showing a further variation of the resin sheet according to the first embodiment of the present invention.
Figure 4:
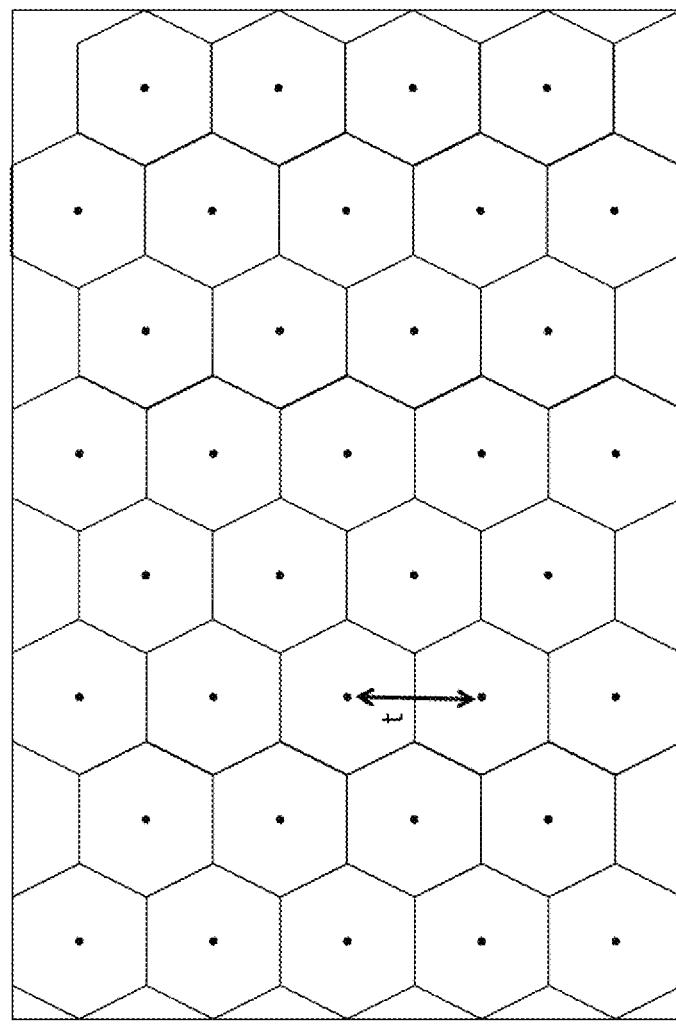
FIG. 4 is a schematic plan view of the resin sheet of FIG. 1.

Below, various embodiments of the resin sheet are described, followed by an explanation of the method for manufacturing the resin sheet, but in cases where the specific explanation provided for one embodiment applies to another embodiment, the corresponding explanation for the other embodiment is omitted.

First Embodiment

The resin sheet according to a first embodiment of the present invention is a resin sheet having hair-like bodies arranged regularly on at least one surface of a base layer containing a thermoplastic resin, wherein the surface with the hair-like bodies has a coefficient of friction, as measured according to KES, of 0.5 or more and 1.0 or less, a deviation of the coefficient of friction, as measured by KES, of 0.010 or more and 0.025 or less, and a deviation of roughness, as measured by KES, of 0.2 or more and 1.5 or less.

<Base Layer>

A base layer (1a) is a layer serving as a base for hair-like bodies and refers to the portion of the surface, denoted by reference sign 1, other than the hair-like bodies 1b. The thickness of the base layer refers to the thickness from the roots of the hair-like bodies to the surface on the opposite side of the base layer. The average thickness of the base layer is preferably 15-1000 μm and more preferably 150-800 μm. By setting the thickness to 15 μm or more, the height of the hair-like bodies can be sufficiently expressed. Moreover, by setting the thickness to 1000 μm or less, the hair-like bodies can be formed efficiently. A continuous phase may be formed without a structural boundary between the base layer and the hair-like bodies. The absence of a structural boundary means that the base layer and the hair-like bodies are integrally formed and that there is no structurally clear boundary section therebetween. Moreover, forming a continuous phase refers to a state in which there is no seam between the base layer and the hair-like bodies and no discontinuities (a continuous phase is formed). This feature differs from a structure in which hair-like bodies are transplanted to a base layer. The base layer and the hair-like bodies may have the same composition and the bonds between the base layer and the hair-like bodies may include covalent bonds. A covalent bond refers to a chemical bond formed by an electron pair being shared by two atoms, and in thermoplastic resins which are chain molecules in which monomers are connected, each polymer is bonded by a covalent bond and is bonded more strongly than by the van der Waals bonds or hydrogen bonds acting between polymer molecules.

Moreover, the base layer and the hair-like bodies may be derived not from separate, but from the same solid thermoplastic resin sheet. Derived from the same solid thermoplastic resin sheet means, for example, the hair-like bodies and the base layer being obtained, directly or indirectly, based on the same solid resin sheet.

Further, the base layer and the hair-like bodies may be formed from the same solid thermoplastic resin sheet. Formed from the same solid thermoplastic resin sheet means that the hair-like bodies and the base layer are directly formed by processing a single resin sheet.

By forming a continuous phase without a structural boundary between the base layer and the hair-like bodies, the hair-like bodies separating from the base layer due to an external stimulus is suppressed and a sheet having a good tactile sensation is achieved. Moreover, manufacturing with fewer steps than when transplanting hair-like bodies becomes possible.

The base layer and the hair-like bodies comprise the same resin composition having a thermoplastic resin as a main component. Having a thermoplastic resin as a main component means containing 50 mass % or more, 60 mass % or more, 70 mass % or more, 80 mass % or more, or 90 mass % or more of a thermoplastic resin. As the thermoplastic resin, a resin containing at least one of a styrene-based resin, an olefin-based resin, a polyvinylchloride resin, a thermoplastic elastomer, or a fluorine-based resin can be used.

As the styrene-based resin, styrene-based monomers such as styrene, α-methylstyrene, p-methylstyrene, dimethylstyrene, p-t-butylstyrene, or chlorostyrene alone or copolymers thereof, copolymers of such a styrene-based monomer and another monomer, for example, a styrene-acrylonitrile copolymer (AS resin), or of the styrene-based monomer and yet another polymer, for example, a graft polymer graft polymerized in the presence of a diene-based rubber-like polymer such as polybutadiene, a styrene-butadiene copolymer, polyisoprene, or polychloroprene, for example, a polystyrene such as high-impact polystyrene (HIPS resin) or a styrene-acrylonitrile graft polymer (ABS resin) can be used. Further, a styrene-based thermoplastic elastomer can also be used.

A polyolefin-based resin means a resin comprising a polymer containing an α-olefin as a monomer and includes polyethylene-based resins and polypropylene-based resins. As the polyethylene-based resin, a high-density polyethylene, a low-density polyethylene, a linear low-density polyethylene, a linear medium-density polyethylene, etc. can be used and not only these alone, but copolymers, grafts, and blends having these structures can also be used. Examples of the latter resins include products of copolymerizing and blending a resin having a polar group in a polyethylene chain, such as blends with an ethylene-vinyl acetate copolymer, an ethylene-acrylic acid copolymer, an ethylene-acrylic acid ester copolymer, an ethylene methacrylic acid ester copolymer, an ethylene-vinyl acetate-vinyl chloride copolymer, or three-component copolymers with a further acid anhydride.

Further, as the polypropylene-based resin, a homopolypropylene, a random polypropylene, a block polypropylene, etc. can be used. When a homopolypropylene is used, the structure of the homopolypropylene may be any of isotactic, atactic, or syndiotactic. When a random polypropylene is used, a substance preferably having 2-20 carbon atoms and more preferably having 4-12 carbon atoms, for example, ethylene, 1-butene, 1-pentene, 1-hexene, 1-heptene, 1-octene, 1-nonene, or 1-decene can be used as the α-olefin to be copolymerized with propylene. When a block polypropylene is used, a block copolymer (block polypropylene), a block copolymer containing a rubber component, a graft copolymer, etc. can be used. These olefin-based resins can be used alone and can also be used in combination with other olefin-based resins.

As the polyvinyl chloride-based resin, a vinyl chloride homopolymer or a copolymer of vinyl chloride and another comonomer can be used. When the polyvinyl chloride is a copolymer, the polyvinyl chloride may be a random copolymer or may be a graft copolymer. One example of a graft copolymer is a copolymer in which, for example, an ethylene-vinyl acetate copolymer or a thermoplastic urethane polymer is used as the backbone polymer and vinyl chloride is graft polymerized thereto. The polyvinyl chloride-based resin of the present embodiment is a composition demonstrating an extrusion-moldable soft polyvinyl chloride and containing an additive such as a polymer plasticizer. A known polymer plasticizer can be used as the polymer plasticizer, but, for example, ethylene copolymer polymer plasticizers, such as an ethylene-vinyl acetate-carbon monoxide copolymer, an ethylene-(meth)acrylic acid ester-carbon monoxide copolymer, and an ethylene-vinyl acetate copolymer with a high vinyl acetate content, can be given as preferred examples.

The thermoplastic elastomer includes elastomers having a structure in which a soft polymer substance and a hard polymer substance are combined. Specific examples include styrene-based elastomers, olefin-based elastomers, vinyl chloride-based elastomers, polyester-based elastomers, polyimide-based elastomers, polyurethane-based elastomers, etc. Regarding polyurethane-based elastomers, as a combination of an isocyanate and a polyol, which are raw materials, any combination of an MDI-based, an $H_{12}$ MDI-based, or an HDI-based isocyanate and a polyether-based, a polyester-based, or a polycarbonate-based polyol may be selected or a plurality thereof may be combined. These elastomers can be selected from among those generally commercially available and used.

A vinylidene fluoride homopolymer and a vinylidene fluoride copolymer having vinylidene fluoride as the main component can be used as the fluorine-based resin. Polyvinylidene fluoride (PVDF) resins are crystalline resins exhibiting various crystal structures such as α-type, β-type, γ-type, and αp-type, but examples of the vinylidene fluoride copolymer include vinylidene fluoride-hexafluoropropylene copolymers, vinylidene fluoride-tetrafluoroethylene copolymers, vinylidene fluoride-chlorotrifluoroethylene copolymers, vinylidene fluoride-trifluoroethylene copolymers, vinylidene fluoride-tetrafluoroethylene-hexafluoropropylene three-component copolymers, vinylidene fluoride-chlorotrifluoroethylene-hexafluoropropylene three-component copolymers, and mixtures of two or more thereof.

Polyethylene terephthalate, polybutylene terephthalate, polyethylene-2,6-naphthalate, polymethylene terephthalate, a polyester resin in which, as copolymerization components, for example, a diol component such as diethylene glycol, neopentyl glycol, and polyalkylene glycol and a dicarboxylic acid component such as adipic acid, sebacic acid, phthalic acid, isophthalic acid, and 2,6-naphthalene dicarboxylic acid are copolymerized, etc. can be used as the polyester-based resin.

As the nylon-based resin, a lactam polymer such as caprolactam or laurolactam, a polymer of an aminocarboxylic acid such as 6-aminocaproic acid, 11-aminoundecanoic acid, or 12-aminododecanoic acid, a polycondensate of a diamine unit such as an aliphatic diamine such as hexamethylenediamine, decamethylenediamine, dodecamethylenediamine, or 2,2,4- or 2,4,4-trimethylhexamethylenediamine, an alicyclic diamine such as 1,3- or 1,4-bis(aminomethyl)cyclohexane or bis(p-aminocyclohexylmethane), or an aromatic diamine such as m- or p-xylylenediamine, and a dicarboxylic acid unit such as an aliphatic dicarboxylic acid such as adipic acid, suberic acid, or sebacic acid, an alicyclic dicarboxylic acid such as cyclohexanedicarboxylic acid, or an aromatic dicarboxylic acid such as terephthalic acid or isophthalic acid, and copolymers, etc. thereof can be used. Examples thereof include nylon 6, nylon 9, nylon 11, nylon 12, nylon 66, nylon 610, nylon 611, nylon 612, nylon 6T, nylon 6I, nylon MXD6, nylon 6/66, nylon 6/610, nylon 6/6T, nylon 6I/6T, etc. and among these, nylon 6 and nylon MXD6 are suitable.

The thermoplastic resin preferably has a melt mass flow rate of 4 g/10 min. or more at 190° C. to 300° C. By setting the rate to 4 g/10 min. or more, the transferability of the shape of the hair-like bodies can be improved. In addition, the melt mass flow rate is a value measured according to JIS K 7210 under the conditions of a load (2.16 Kg to 10.0 Kg) at a test temperature in the temperature range from 190° C. to 300° C.

The thermoplastic resin may be alloyed with the above-mentioned thermoplastic resins at an arbitrary ratio so long as the effects of the present invention are not inhibited. Furthermore, the thermoplastic resin may contain other additives. As the other additives, so long as the effects of the present invention are not inhibited, an additive such as a water/oil repellent, a colorant such as a pigment or a dye, a mold release agent such as silicone oil or an alkyl ester-based agent, a fibrous reinforcing agent such as glass fibers, or as a filler, a granular microparticle such as talc, clay, or silica, or a scaly microparticle such as mica, a low molecular weight type anti-static agent such as a salt compound of sulfonic acid and an alkali metal, etc. or a high molecular weight type anti-static agent such as polyether ester amide, an ultraviolet light absorber, a flame retardant, an anti-bacterial agent, an anti-viral agent, or a heat stabilizer can be added. Moreover, scrap resin generated in the resin sheet manufacturing process can also be mixed and used.

Examples of the water/oil repellent include silicone-based water repellents, carnauba wax, and fluorine-based water/oil repellents. Examples of the silicone include organopolysiloxane, dimethylpolysiloxane, methylphenylpolysiloxane, methylhydrogenpolysiloxane, etc. and among these, dimethylpolysiloxane is suitably used. Examples of commercially available products include "Clinbell CB50-PP," "Clinbell CB-30PE," "Clinbell CB-1," "Clinbell CB-50AB" (manufactured by Fuji Chemical Industries, Ltd.), etc. in which a silicone is alloyed with a resin. Examples of the carnauba wax include, as commercially available products, "Carnauba No. 1" (manufactured by NIKKO RICA CORPORATION), etc. Examples of the fluorine-based oil/water repellents include surfactants having a perfluoroalkyl group and also include, as commercially available products, "Surflon KT-PA" (manufactured by AGC SEIMI CHEMICAL CO., LTD.). The amount of the water/oil repellent added is preferably 0.5 mass % to 25 mass %. At less than 0.5 mass %, sufficient water/oil repelling effects may be unobtainable, and at greater than 25 mass %, the moldability may be poor.

Examples of the anti-static agent include polyether ester amide-based high molecular weight type anti-static agents, ionomer-based high molecular weight type anti-static agents, etc. Examples of the polyether ester amide-based high molecular weight type anti-static agent include, as commercially available products, "Pelestat 230," "Pelestat 6500," "Pelectron AS," "Pelectron HS" (manufactured by Sanyo Chemical Industries, Ltd.), etc. Examples of the ionomer-based high molecular weight type anti-static agent include, as commercially available products, "Entira SD100," "Entira MK400" (manufactured by DU PONT-MITSUI POLYCHEMICALS), etc. The amount of the anti-static agent added is preferably 5 mass % to 30 mass %. At less than 5 mass %, sufficient anti-static properties may be unobtainable, and at greater than 30 mass %, the production costs increase.

As the anti-bacterial agent, either an inorganic or organic anti-bacterial agent may be added. Considering dispersibility, inorganic agents are preferable. Specific examples include metal ion (Ag, Zn, Cu) inorganic anti-bacterial agents, calcined shell calcium-based anti-bacterial agents, etc. Examples of commercially available metal ion inorganic anti-bacterial agents include "Bactekiller BM102VT" (manufactured by Fuji Chemical Industries, Ltd.), "Novaron VZF200," "Novaron (AG300)" (manufactured by TOAGOSEI CO., LTD.), "KM-10D-G", "IM-10D-L" (manufactured by Sinanen Zeomic Co., Ltd.), etc. Examples of the calcined shell calcium-based anti-bacterial agent include "Scallow" (manufactured by FID, Ltd.), etc. The amount of the anti-bacterial agent added is preferably 0.5 mass % to 5 mass %. At less than 0.5 mass %, sufficient anti-bacterial properties may be unobtainable, and at greater than 5 mass %, the production costs increase.

As the ultraviolet light absorber, an inorganic or organic ultraviolet light absorber can be used.

As the inorganic ultraviolet light absorber, for example, titanium oxide, zinc oxide, cesium oxide, iron oxide, and many other types of inorganic ultraviolet light absorbers can be used. Among these, zinc oxide is particularly superior and preferable in terms of transparency and ultraviolet light impermeability. As commercially available products, for example, the triazine-based ultraviolet light absorber "TINUVIN 1600" (manufactured by BASF), etc. can be used.

When an inorganic ultraviolet light absorber is used, the amount added is preferably 1-5 parts by mass with respect to a total of 100 parts by mass of the resin composition. When the amount added is less than 1 part by mass, the effect of suppressing ultraviolet light-induced sheet deterioration may be reduced, and when the amount is greater than 5 parts by mass, the production costs increase.

Moreover, it is also possible to use a masterbatch, etc., in which an inorganic ultraviolet light absorber is alloyed in advance with a thermoplastic resin. Examples of commercially available masterbatches with a urethane-based thermoplastic elastomer base include "Weather Resistant Master UNS (Polyester-Based)" (manufactured by FCI Co., Ltd.) and "Weather Resistant Master UNE (Polyether-Based)" (manufactured by FCI Co., Ltd.), and considering production efficiency, it is preferable that a masterbatch be used. The amount of masterbatch added is preferably 1-5 parts by mass with respect to 100 parts by mass of the resin composition.

Moreover, as the organic ultraviolet light absorber, for example, triazine-based, benzotriazole-based, oxalic acid-based, benzophenone-based, hindered amine-based, and many other types of organic ultraviolet light absorbers can be used. Preferably, a high molecular weight type ultraviolet light absorber with a molecular weight of 300 or more is suitably used in order to minimize volatilization during manufacturing or use of the film.

When an organic ultraviolet light absorber is used, the amount added is preferably 4 parts by mass or more with respect to a total of 100 parts by mass of the resin composition. When the content is less than 4 part by mass, a sufficient effect of suppressing ultraviolet light-induced sheet deterioration may be unobtainable. Meanwhile, even at greater than 8 parts by mass, not only will the effect of suppressing ultraviolet light-induced sheet deterioration level off but the costs will also be unpreferable.

As the lubricating material/mold release agent, an alkyl-based mold release agent such as an aliphatic hydrocarbon-based compound, a higher fatty acid-based compound, a higher aliphatic alcohol-based compound, or a fatty acid amide-based compound, a silicone-based mold release agent, a fluorine-based mold release agent, etc. can be used. When a mold release agent is used, the amount added is preferably 0.01-5 parts by mass, more preferably 0.05-3 parts by mass, and yet more preferably 0.1-2 parts by mass, of a total of 100 parts by mass with the resin composition. When the amount added is less than 0.01 parts by mass, the mold releasing effect may be reduced, and at greater than 5 parts by mass, bleed-out may occur on the sheet surface.

Moreover, it is also possible to use a masterbatch, etc., in which a lubricating material/mold release agent is alloyed in advance with a thermoplastic resin. Examples of commercially available masterbatches with a urethane-based thermoplastic elastomer base include "Waxmaster V" (manufactured by BASF), and considering production efficiency, it is preferable that a masterbatch be used. The amount of masterbatch added is preferably 1-8 parts by mass, more preferably 2-7 parts by mass, and yet more preferably 3-6 parts by mass of a total of 100 parts by mass with the resin composition.

<Hair-Like Bodies>

Hair-like bodies (1b) refer to a portion extending hair-like from the surface of the base layer (1a), as shown in FIG. 1. The hair-like bodies are arranged regularly on the surface of the base layer. Here, arranged regularly means a state in which the hair-like bodies are not arranged randomly, that is, a state arranged in an orderly fashion (e.g., at fixed spacing) in one direction or in two directions. Whether or not the arrangement of the hair-like bodies is regular is determined based on the state of arrangement of the roots of the hair-like bodies. In certain embodiments, the hair-like bodies are positioned on the base layer at a predetermined spacing and the positions of the bottom surfaces of the hair-like bodies are arranged in an orderly fashion in the longitudinal direction and the transverse direction of the base layer. Moreover, the form of arrangement of the hair-like bodies is not particularly limited and a vertically and horizontally arranged grid arrangement, a staggered arrangement, etc. can be selected. Due to the hair-like bodies being arranged regularly on the surface of the base layer, a good tactile sensation is readily expressed, uniformly and without irregularities. Falling of the hair-like bodies occurs due to the application of a load such as, for example, tracing with a finger and finger marks in which the gloss and color tone differ from those of the surrounding portion can be formed. Moreover, due to the hair-like bodies, the tactile sensation can become like that of a suede-like napped sheet.

The average height (h) of the hair-like bodies is preferably 30-500 µm, more preferably 30-250 µm, and yet more preferably 30-200 µm. By setting the average height to 30 µm or more, a good tactile sensation can be sufficiently ensured and by setting the average height to 500 µm or less, a good tactile sensation such as moistness, softness, or fluffiness is obtained.

When the hair-like bodies stand roughly straight with respect to the base layer, the length from the root to the tip of the hair-like bodies represents the height of the hair-like bodies. Meanwhile, when the hair-like bodies are slanted with respect to the base layer or when the hair-like bodies have a portion that curls, the distance from the surface of the base layer at the location of the hair-like bodies most removed from the surface of the base layer is made the height h of the hair-like bodies. Moreover, the total value of the spacing from the tip to a central portion of the root of the hair-like bodies, subdivided by multi-point measurement, is made the length L of the hair-like bodies.

The height of the hair-like bodies and the length of the hair-like bodies are measured, using an electron microscope and image processing software, at a number of arbitrary locations on the resin sheet and arithmetic mean values of the measurements can be used as the average height of the hair-like bodies and the average length of the hair-like bodies.

The average diameter (d) of the hair-like bodies is preferably 1-50 µm and more preferably 5-30 µm. By setting the average diameter of the hair-like bodies to 1 µm or more, a good tactile sensation can be ensured and by setting the average diameter of the hair-like bodies to 50 µm or less, a good tactile sensation such as moistness, softness, or fluffiness is obtained. The diameter at mid-height (h/2) of the hair-like bodies is measured, using an electron microscope and image processing software, at a number of locations on the resin sheet and an arithmetic mean value of the measurements is used as the average diameter of the hair-like bodies.

Moreover, the aspect ratio of the hair-like bodies can be represented as (average height of the hair-like bodies/average diameter of the hair-like bodies). The aspect ratio of the hair-like bodies is preferably 2-20, more preferably 2-10, and yet more preferably 2-5. By setting the aspect ratio to 2 or more, a good tactile sensation can be ensured and by setting the aspect ratio to 20 or less, not only is a good tactile sensation such as moistness, softness, or fluffiness obtained, but the risk of the height to length ratio of the hair-like bodies becoming no higher than a certain level can also be reduced.

Meanwhile, the average bottom surface diameter of the hair-like bodies can also serve as a reference for the aspect ratio. The average bottom surface diameter of the hair-like bodies is preferably 10-150 µm. The spacing between neighboring hair-like bodies is measured at a number of locations on the resin sheet and an arithmetic mean value of the measurements is used as the average bottom surface diameter of the hair-like bodies. The aspect ratio, when the bottom surface diameter of the hair-like bodies serves as a reference therefor, is preferably 1.0-10, more preferably 1.0-5, and yet more preferably 1.0-2.5. By setting the aspect ratio to 1.0 or more, a good tactile sensation can be ensured and by setting the aspect ratio to 10 or less, not only is a good tactile sensation such as moistness, softness, or fluffiness obtained, but the risk of the height to length ratio of the hair-like bodies becoming no higher than a certain level can also be reduced.

The average spacing (t) between the hair-like bodies is preferably 20-200 µm and more preferably 40-150 µm. The spacing between the hair-like bodies means the distance from the center of the root of a hair-like body to the center of the root of a neighboring hair-like body. By setting the average spacing to 20 µm or more, a good tactile sensation is ensured and by setting the average spacing to 200 µm or less, a good tactile sensation such as moistness, softness, or fluffiness is obtained. The spacing between neighboring hair-like bodies is measured at a number of locations on the resin sheet and an arithmetic mean value of the measurements is used as the average spacing of the hair-like bodies.

The shape of the hair-like bodies is not particularly limited and may be configured to extend hair-like in a direction away from the base layer in a shape in which the hair-like bodies gradually thin approaching the tip or in which a swelling is formed at the tip. In short, the hair-like bodies may have a shape in which the cross-sectional area gradually shrinks with increasing distance from the base layer and then once again increases when the shape terminates. Moreover, the shape of the tip part of the hair-like bodies may be bud-shaped or mushroom-shaped. Moreover, the hair-like bodies may have a portion positioned at the base end extending in a direction away from the base layer, a portion that extends from the portion positioned at the base end and is curved with a fixed curvature or a curvature that gradually changes, and furthermore, a portion that is wound in a helix shape or a spiral shape. In this case, the tip parts of the hair-like bodies may have a shape that is folded inward. By having such a shape, a better tactile sensation is expressed. Moreover, due to the bud-shaped or mushroom-shaped portion being hollow, a better tactile sensation is expressed. When forming a bud shape or mushroom shape at the hair-like tips, it is preferable that the ratio of the average diameter of the width of the bud shape or mushroom shape with respect to the average diameter of the hair-like bodies be 1.1 or more. The height of the bud shape or mushroom shape is preferably 7 µm or more. The average diameter of the hair-like bodies and the average diameter of the width and the height of the bud shape or mushroom shape are values obtained by using the arithmetic mean value of measurements made with a scanning electron microscope photograph. The hair-like bodies comprise a thermoplastic resin. The same resins that can be used in the base layer can be used as the thermoplastic resin.

The thermoplastic resin included in the base layer and the hair-like bodies may form at least partially a three-dimensional cross-linked structure (e.g., a three-dimensional net-like structure). For example, in certain embodiments, at least some of the hair-like bodies are cross-linked bodies, and in other embodiments, the overall surface of the hair-like bodies is a cross-linked body, and in yet other embodiments, the entirety (from the boundary with the base layer to the tip part) of the hair-like bodies is a cross-linked body. Examples of methods for forming a cross-linked body include a method involving forming a resin sheet and then irradiating a surface thereof having hair-like bodies with an electron beam and a method involving adding an organic peroxide and heating and humidifying after or during molding of the resin sheet. Examples of resins in which an organic peroxide has been added include commercially available products such as "LINKLON" manufactured by Mitsubishi Chemical Corporation. In the present embodiment, it is preferable that cross-linked bodies be formed by electron beam irradiation (electron beam cross-linked bodies).

<Resin Sheet>

In one embodiment of the present invention, the thickness of the resin sheet refers to the sheet thickness combining the average height of the hair-like bodies and the average thickness of the base layer. The sheet thickness is preferably 50-1500 µm, more preferably 50-1050 µm, and yet more preferably 120-500 µm. By setting the thickness to 50 µm or more, a good tactile sensation can be sufficiently ensured and by setting the thickness to 1500 µm or less, manufacturing costs can be suppressed.

In the present embodiment, "tactile sensation" means the feeling and texture of a surface of the resin sheet. A judgment is made regarding whether a resin sheet surface feels comfortable when touched and when the surface is judged as feeling comfortable, a resin sheet having a good specific texture such as moistness, softness, or fluffiness is deemed to have a good tactile sensation. Moreover, besides being specified by a sensory evaluation of texture, etc., a good tactile sensation can be specified by the coefficient of friction (MIU) of the resin sheet, the deviation of the coefficient of friction (MMD), the deviation of roughness (SMD), or the previously discussed aspect ratio.

In the present embodiment, the coefficient of friction (MIU) is measured according to KES. From the perspective of both conferring a comfortable tactile sensation to the resin sheet and achieving film productivity, the surface with the hair-like bodies preferably has a coefficient of friction of 0.5 or more and 1.0 or less, more preferably 0.6 or more and 0.79 or less, and yet more preferably 0.65 or more and 0.78 or less. When the coefficient of friction, as measured according to KES, is less than 0.5, the film may lack a comfortable tactile sensation and when the coefficient of friction is greater than 1.0, the film does not have sufficient slipperiness and air release becomes poor when the film is wound into the shape of a roll in the manufacturing process, which may cause a winding shape defect.

In addition, the abovementioned coefficient of friction can be achieved by selecting raw materials for the resin sheet or changing the height of the hair-like bodies.

In the present embodiment, the deviation of the coefficient of friction (MMD) is measured according to KES. To impart a smooth tactile sensation to the film, the sheet surface with the hair-like bodies preferably has a deviation of the coefficient of friction of 0.010 or more and 0.025 or less, more preferably 0.012 or more and 0.022 or less, and yet more preferably 0.013 or more and 0.021 or less. When the deviation of the coefficient of friction, as measured according to KES, is less than 0.010, the unique sensation of the hair-like bodies may be unperceivable. Moreover, at greater than 0.025, smoothness may be unperceivable due to fingers becoming caught during contact.

In addition, the abovementioned deviation of the coefficient of friction can be achieved by selecting raw materials for the resin sheet or changing the height of the hair-like bodies.

In the present embodiment, the deviation of roughness (SMD) is measured according to KES. The shape of the film surface can be confirmed indirectly, and the sheet surface with the hair-like bodies preferably has a deviation of roughness of 0.2 or more and 1.5 or less, more preferably 0.22 or more and 1.0 or less, and yet more preferably 0.24 or more and 0.7 or less. When the deviation of roughness, as measured according to KES, is less than 0.2, the surface shape approaches a flat surface shape and the unique sensation of the hair-like bodies may be unperceivable and when the deviation of roughness is greater than 1.5, the surface shape may be rough and give a coarse tactile sensation.

In addition, the abovementioned deviation of roughness can be achieved by changing the height or the shape of the hair-like bodies.

In one embodiment of the present invention, the surface with the hair-like bodies preferably has a ratio (MIU/MMD) between the coefficient of friction, as measured according to KES, and the deviation of the coefficient of friction, as measured according to KES, of 40 or more and less than 55, more preferably 42 or more and less than 55, and yet more preferably 44 or more and less than 55. When the surface with the hair-like bodies has a high MIU/MMD ratio, a tactile sensation of softer hair with a smoother texture can be perceived, but when the ratio is 55 or more, there may be a catching feeling on fingers during contact. When the surface with the hair-like bodies has a low MIU/MMD ratio, the sensation may be dry and moistness may be unperceivable.

In another embodiment of the present invention, the hair-like bodies and the base layer preferably have a color difference ΔE of 10 or less, more preferably 5 or less, and yet more preferably 3 or less before and after testing upon 500 hours of irradiation at a black panel temperature of 63° C. and an irradiance of 60 W/m² using a xenon lamp-type accelerated weather resistance tester. When the hair-like bodies and the base layer have a color difference ΔE of 10 or less, there will be little discoloration even when used in places on which ultraviolet light or the like is shone, thus making the resin sheet suitable for such uses as automobile interior materials.

Second Embodiment

Figure 5:
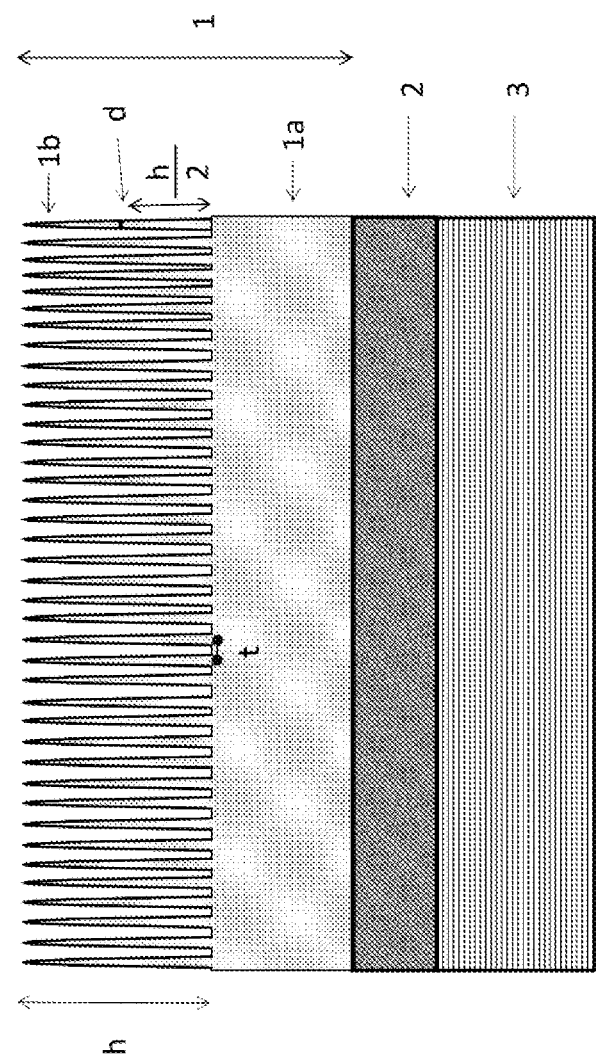
FIG. 5 is a vertical side cross-sectional schematic view showing a layer structure of a resin sheet according to a second embodiment of the present invention.

An example of the resin sheet according to a second embodiment of the present invention is a resin sheet in which a sealant resin layer (2) is formed between a base layer (1) and a substrate layer (3), as shown in FIG. 5. That is, the layer configuration of the resin sheet according to the second embodiment is, from top to bottom, the hairlike bodies and the base layer (1), the sealant resin layer (2), and the substrate layer (3). Here, the hair-like bodies are the same as those explained in the first embodiment, so explanation thereof is omitted. However, the thickness of the hair-like bodies and the base layer represented by the total of the average height of the hair-like bodies and the average thickness of the base layer is preferably 150-1500 μm, more preferably 150-1050 μm, and yet more preferably 150-500 μm. By setting the thickness to 150 μm or more, a good tactile sensation can be ensured and by setting the thickness to 1500 μm or less, production costs can be suppressed.

<Substrate Layer>

The substrate layer is preferably a thermoplastic resin such as a styrene-based resin, an olefin-based resin, a polyester-based resin, a nylon-based resin, an acrylic resin, or a thermoplastic elastomer. Moreover, when laminating, lamination may be performed by coextrusion molding or by extrusion laminate molding or dry laminate molding using a nonoriented film or a biaxially oriented film.

As the polyester-based resin, polyethylene terephthalate, polybutylene terephthalate, polyethylene-2,6-naphthalate, polymethylene terephthalate, a polyester resin in which, as copolymerization components, for example, a diol component such as diethylene glycol, neopentyl glycol, polyalkylene glycol, and a dicarboxylic acid component such as adipic acid, sebacic acid, phthalic acid, isophthalic acid, 2,6-naphthalene dicarboxylic acid are copolymerized, etc. can be used.

As the nylon-based resin, a lactam polymer such as caprolactam or laurolactam, a polymer of an aminocarboxylic acid such as 6-aminocaproic acid, 11-aminoundecanoic acid, or 12-aminododecanoic acid, a polycondensate of a diamine unit such as an aliphatic diamine such as hexamethylenediamine, decamethylenediamine, dodecamethylenediamine, or 2,2,4- or 2,4-4-trimethylhexamethylenediamine, an alicyclic diamine such as 1,3- or 1,4-bis (aminomethyl)cyclohexane or bis(p-aminocyclohexylmethane), or an aromatic diamine such as m- or p-xylylenediamine, and a dicarboxylic acid unit such as an aliphatic dicarboxylic acid such as adipic acid, suberic acid, or sebacic acid, an alicyclic dicarboxylic acid such as cyclohexanedicarboxylic acid, or an aromatic dicarboxylic acid such as terephthalic acid or isophthalic acid, and copolymers, etc. thereof can be used. Examples thereof include nylon 6, nylon 9, nylon 11, nylon 12, nylon 66, nylon 610, nylon 611, nylon 612, nylon 6T, nylon 6I, nylon MXD6, nylon 6/66, nylon 6/610, nylon 6/6T, nylon 6I/6T, etc. and among these, nylon 6 and nylon MXD6 are suitable.

If the polymer is a vinyl polymer based on methacrylic acid ester monomers, it can be used as an acrylic resin and the structure, etc. thereof is not particularly limited. Examples of the methacrylic acid ester monomers include methyl methacrylate, ethyl methacrylate, propyl methacrylate, butyl methacrylate, pentyl methacrylate, hexyl methacrylate, etc. Moreover, the alkyl group such as a propyl group, butyl group, pentyl group, or hexyl group in the methacrylic acid ester monomer may be linear or may be branched. The methacrylic acid ester resin may be a homopolymer of a methacrylic acid ester monomer or a copolymer of multiple methacrylic acid ester monomers and may have monomer units derived from known vinyl compounds other than methacrylic acid ester such as ethylene, propylene, butadiene, styrene, α-methylstyrene, acrylonitrile, and acrylic acid.

The substrate layer may be alloyed with the abovementioned thermoplastic resins at an arbitrary ratio so long as the effects of the present invention are not inhibited, as necessary. Furthermore, other additives may also be included. Additives such as water/oil repellents, colorants such as pigments or dyes, mold release agents such as silicone oil or alkyl ester-based agents, fibrous reinforcement agents such as glass fibers, granular lubricants such as talc, clay, or silica, a salt compound of sulfonic acid and an alkali metal or the like, antistatic agents, ultraviolet absorbing agents, flame retardants, and antibacterial agents can be added as the other additives in a range that does not inhibit the effects of the present invention. Moreover, scrap resin generated in the resin sheet manufacturing process can be mixed and used.

Moreover, in the present embodiment, so long as the effects of the present invention are not inhibited, the substrate layer may have a partially cross-linked structure.

In the present embodiment, the average thickness of the substrate layer is preferably 50-1500 μm, more preferably 100-1000 μm, and yet more preferably 150-500 μm. By setting the average thickness to 50 μm or more, the film-forming process is facilitated and by setting the average thickness to 1500 μm or less, production costs can be suppressed.

<Sealant Resin Layer>

The sealant resin layer is for causing adhesion between the base layer and the substrate layer to be expressed and a modified olefin-based resin, a hydrogenated styrene-based thermoplastic elastomer, etc. can be used as resin components.

As the modified olefin-based resin, olefin-based resins such as olefins with about 2-8 carbon atoms such as ethylene, propylene, and butene-1, copolymers of these olefins and other olefins with about 2-20 carbon atoms such as ethylene, propylene, butene-1,3-methylbutene-1, pentene-1, 4-methylpentene-1, hexene-1, octene-1, and decene-1 or copolymers of these olefins and vinyl compounds such as vinyl acetate, vinyl chloride, acrylic acid, methacrylic acid, acrylic acid ester, methacrylic acid ester, and styrene, and olefin-based rubbers such as ethylene-propylene copolymers, ethylene-propylene-diene copolymers, ethylene-butene-1 copolymers, and propylene-butene-1 copolymers modified under graft reaction conditions with unsaturated carboxylic acids such as acrylic acid, methacrylic acid, crotonic acid, isocrotonic acid, maleic acid, fumaric acid, itaconic acid, citraconic acid, and tetrahydrophthalic acid or derivatives of the acids such as halides, amides, imides, anhydrides, and esters, specifically, malonyl chloride, maleimide, maleic anhydride, citraconic anhydride, monomethyl maleate, dimethyl maleate, and glycidyl maleate can be used.

Among these, an "ethylene-propylene-diene copolymer" or ethylene-propylene or butene-1 copolymer rubber, modified with an unsaturated dicarboxylic acid or an anhydride thereof, in particular maleic acid or an anhydride thereof, is suitable.

As the hydrogenated styrene-based thermoplastic elastomer, a hydrogenated copolymer of a styrene-based monomer and butadiene or isoprene, a hydrogenated styrene-butadiene-styrene block copolymer (styrene-ethylene/butylene-styrene block copolymer), a hydrogenated styrene-isoprene-styrene block copolymer (styrene-ethylene/propylene-styrene block copolymer), etc. can be used and, in particular, a styrene-ethylene/butylene-styrene block copolymer is preferable.

The average thickness of the sealant resin layer is preferably 20-90 μm and more preferably 40-80 μm. By setting the average thickness to 20 μm or more, interlayer separation occurring between the base layer and the substrate layer can be suppressed and by setting the average thickness to 90 μm or less, production costs can be suppressed.

The sealant resin layer may be alloyed with the abovementioned thermoplastic resins at an arbitrary ratio so long as the effects of the present invention are not inhibited, as necessary. Furthermore, other additives may also be included. As the other additives, so long as the effects of the present invention are not inhibited, an additive such as a water repellent, an oil repellent, a colorant such as a pigment or a dye, a lubricating material/mold release agent such as silicone oil or an alkyl ester-based agent, a fibrous reinforcing agent such as glass fibers, or as a filler, a granular microparticle such as talc, clay, or silica, or a scaly microparticle such as mica, a low molecular weight type anti-static agent such as a salt compound of sulfonic acid and an alkali metal, etc. or a high molecular weight type anti-static agent such as polyether ester amide, an ultraviolet light absorber, a flame retardant, an anti-bacterial agent, an anti-viral agent, or a heat stabilizer can be added. Moreover, in the present embodiment, so long as the effects of the present invention are not inhibited, the sealant resin layer may have a partially cross-linked structure.

Third Embodiment

Figure 6:
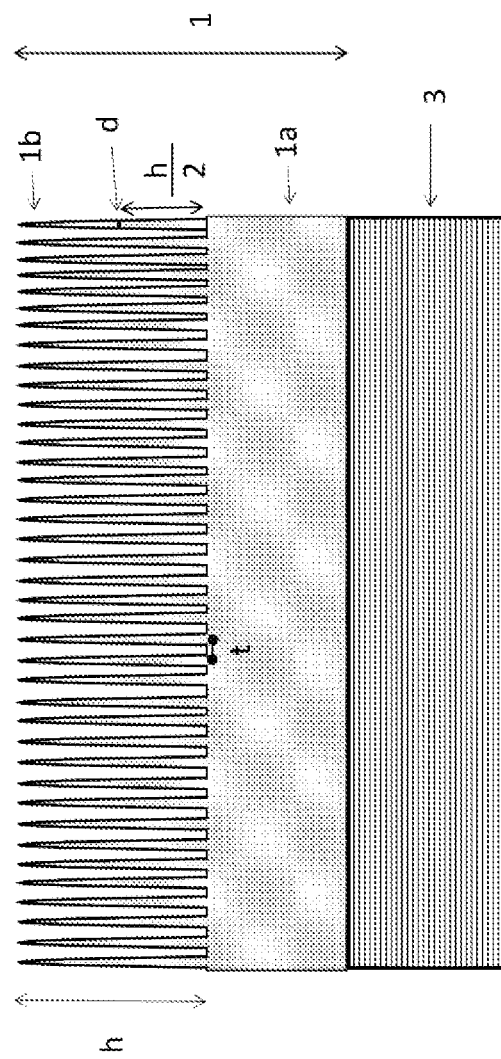
FIG. 6 is a vertical side cross-sectional schematic view showing a layer structure of a resin sheet according to a third embodiment of the present invention.

The resin sheet according to a third embodiment of the present invention is one in which the hair-like bodies and the base layer (1) and the substrate layer (3) are directly laminated without using the sealant resin sheet (2) indicated in the second embodiment, as shown in FIG. 6. That is, the layer configuration of the resin sheet according to the third embodiment is, from top to bottom, the hair-like bodies and the base layer (1)/the substrate layer (3) and is the layer configuration for the thermoplastic resin sheet according to the second embodiment from which the sealant resin layer has been removed. Here, the hair-like bodies and the base layer are the same as those in the first embodiment and the second embodiment, so explanation thereof is omitted. Meanwhile, the substrate layer (3) in the present embodiment is preferably a layer provided with sufficient adhesion with the base layer.

Moreover, in the resin sheet according to the third embodiment, it is preferable that a thermoplastic resin with excellent adhesion with the base layer be used as the substrate layer. For example, when the base layer is a fluorine-based resin, an acrylic resin can be used and when the base layer is an olefin-based resin, a styrene-based resin composition to which a hydrogenated styrene-based thermoplastic elastomer has been added can be used. When using an impact-resistant polystyrene resin and a hydrogenated styrene-based thermoplastic elastomer in combination, adding 5-10 parts by mass of the hydrogenated styrene-based thermoplastic elastomer with respect to 90-95 parts by mass of the impact-resistant polystyrene resin is preferred. In this case, by setting the amount of the hydrogenated styrene-based thermoplastic elastomer added to 5 parts by mass or more, adhesion with the base layer becomes sufficient and the occurrence of interlayer separation can be suppressed, and by setting the amount added to 10 parts by mass or less, production costs can be suppressed.

In the same manner as the second embodiment, the substrate layer may be alloyed with the abovementioned thermoplastic resins at an arbitrary ratio so long as the effects of the present invention are not inhibited. Furthermore, other additives may also be included. As the other additives, so long as the effects of the present invention are not inhibited, an additive such as a water repellent, an oil repellent, a colorant such as a pigment or a dye, a lubricating material/mold release agent such as silicone oil or an alkyl ester-based agent, a fibrous reinforcing agent such as glass fibers, or as a filler, a granular microparticle such as talc, clay, or silica, or a scaly microparticle such as mica, a low molecular weight type anti-static agent such as a salt compound of sulfonic acid and an alkali metal, etc. or a high molecular weight type anti-static agent such as polyether ester amide, an ultraviolet light absorber, a flame retardant, an anti-bacterial agent, an anti-viral agent, or a heat stabilizer can be added. Moreover, in the present embodiment, so long as the effects of the present invention are not inhibited, the substrate layer may have a partially cross-linked structure.

[Resin Sheet Manufacture]

The method for manufacturing a resin sheet according to the present application is not limited and may be any method, but typically includes steps of melt-extruding a raw resin and adding regularly arranged hair-like bodies to at least one surface of the obtained extruded resin sheet.

In the manufacture of a single layer sheet or a multilayer sheet, any resin sheet molding method can be used. Examples include methods for melt-extruding raw resins using a single-screw extruder when the sheet is single layer and multiple single-screw extruders when the sheet is multilayer and obtaining a resin sheet with a T-die. When the sheet is multilayer, a feed block or a multi-manifold die can be used. Moreover, the layer configurations of the embodiments of the resin sheet of the present application are basically as discussed previously, but beyond these, for example, scrap raw material generated in a manufacturing process for the resin sheet or molded container of the present invention may be added to the substrate layer or laminated as a further layer so long as degradation of physical properties, etc. is not observed.

The method for adding the hair-like bodies is not particularly limited and an arbitrary method known by a person skilled in the art can be used. Examples include a manufacturing method using an extrusion molding technique, a manufacturing method using a roll-to-roll technique, a manufacturing method using a photolithography technique, a manufacturing method using a hot pressing technique, a manufacturing method using a pattern roll and a UV curable resin, a manufacturing method using a 3D printer, a method for covalently bonding with a polymerization reaction after embedding the hair-like bodies in the resin layer, etc.

For example, when using an extrusion molding technique, the resin sheet according to the present invention can be manufactured by extruding a resin sheet with a T-die technique and casting with a transfer roll on which a relief process has been performed and a touch roll so as to add the shapes of hair-like bodies to a surface of the resin sheet.

As the transfer roll on which a relief process has been performed, a roll in which a micro-relief, with a size from several micrometers to several hundreds of micrometers, has been applied regularly on a surface thereof with a laser engraving or electrocasting method, an etching method, a mill engraving method, etc. can be used. Here, regular means that the relief is in an arranged state that is not random, that is, is arranged in an orderly fashion in one direction or in two directions. The arrangement of the relief in certain embodiments can be selected from a vertically and horizontally arranged grid arrangement, a staggered arrangement, etc. Examples of the shape of the relief part include, if the shape of a concavity, funnel-shapes (cone, quadrangular pyramid, triangular pyramid, hexagonal pyramid, etc.), semicircles, rectangles (quadrangular prism), etc. As the size thereof, the diameter of the opening of the concavity, the depth of the concavity, the spacing of the concavity shapes, etc. are from several micrometers to several hundreds of micrometers. For example, a metal, a ceramic, etc. can be used as the material of the transfer roll. The spacing between the hair-like bodies can be adjusted by adjusting the spacing between the concavities on the transfer roll and the height of the hair-like bodies can be adjusted by adjusting the depth of the concavities on the transfer roll, and the tactile sensation can also be adjusted thereby.

Moreover, it is preferable that a relief process with a high aspect ratio be performed on the transfer roll surface. For example, the aspect ratio (concavity depth/concavity opening diameter) when processing concavity shapes into the transfer roll surface is preferably 1.0-9.0. In performing a high aspect ratio relief process on the transfer roll surface, in comparison with an etching method, a blasting method, a mill engraving method, etc., a laser engraving method or an electrocasting method is suitable when performing precision processing in the depth direction and thus is particularly suitably used.

For example, a metal, a ceramic, etc. can be used as the material of the transfer roll. Meanwhile, various materials can be used as the touch roll, for example, a roll made from silicone-based rubber, NBR-based rubber, EPT-based rubber, butyl rubber, chloroprene rubber, or fluorine rubber can be used. In certain embodiments, a touch roll with a rubber hardness (JIS K 6253) of 40-100 can be used. Moreover, a Teflon® layer may be formed on the surface of the touch roll.

Various materials can be used as the touch roll, for example, a roll made from silicone-based rubber, NBR-based rubber, EPT-based rubber, butyl rubber, chloroprene rubber, or fluorine rubber can be used. In certain embodiments, a touch roll with a rubber hardness (JIS K 6253) of 40-100 can be used. Moreover, a Teflon® layer may be formed on the surface of the touch roll.

The resin sheet of the present embodiment can be manufactured by using a roll set of the above transfer roll and touch roll.

In certain embodiments, a resin sheet of the present embodiment can be manufactured by adjusting the temperature of the transfer roll to near the crystal fusion temperature, the glass transition point, or the melting point of the thermoplastic resin (for example, 100-150° C. when using a random polypropylene) and casting with a pinch pressure between the transfer roll and the touch roll of 30-120 Kg/cm$^2$. The cast resin sheet is taken in at a line speed of 0.5-30 m/min. using a pinch roll, etc.

Further, while the above embodiments are shown specifically, the present invention is not limited thereto.

[Molded Article]

The molded article of the present invention is a molded article using the resin sheet of the present invention. The resin sheet of the present invention is compatible with molding in general and examples of molding methods include, other than insert molding and in-mold molding, general vacuum molding and pressure molding, and as applications thereof, a method of heating and softening a resin sheet in vacuum and overlaying on (molding to) a surface of an existing molded product by opening under atmospheric pressure, etc., but the molding method is not limited thereto. Moreover, known sheet heating methods such as radiation heating with an infrared heater or the like, which is non-contact heating, can be adapted as a method to heat and soften a sheet before molding. In vacuum pressure molding in certain embodiments, for example, a resin sheet is heated for 20-480 seconds at a surface temperature of 60-220° C. and then molded onto an existing molded article surface and can be stretched to 1.05-2.50 times depending on the surface shape.

[Product]

The resin sheet to which the hair-like bodies according to the present invention have been added to a surface thereof can be applied to a use requiring the good tactile sensation indicated above. For example, the resin sheet of the present invention can be applied to automobile interior materials, electronic devices, electronic device cladding, cosmetic containers or container members, stationery members, lighting fixture members, and daily commodities members.

Examples of the automobile interior material include portions of the automobile interior that hands touch such as the steering wheel, dashboard, levers, and switches. Examples include interior materials in which the abovementioned resin sheet has been attached, for example, by vacuum pressure molding, to a surface of a known instrument panel or pillar (for example, JP 2009-184421 A). By attaching the resin sheet, an interior material imparted with a good tactile sensation can be achieved. As the material of the resin sheet to be attached, in consideration of weather resistance and chemical resistance, olefin-based resins, vinyl chloride-based resins, and urethane-based elastomers are preferable. The method for attaching the resin sheet and the interior material together is not particularly limited.

Examples of the electronic device cladding include transmitter housings for keyless entry systems, smartphone housings, smartphone cases, music player cases, game console housings, digital camera housings, electronic notebook housings, calculator housings, tablet housings, mobile computer housings, keyboards, mice, etc. Examples include portable transmitters in which the resin sheet of the present invention has been attached, for example, by vacuum pressure molding, to a surface of a portable transmitter housing of a known keyless entry system (for example, JP 2005-228911 A). By attaching the resin sheet, a portable transmitter imparted with a good tactile sensation can be achieved. As the material of the resin sheet to be attached, an olefin-based resin or a urethane-based elastomer is preferable. The method for attaching the resin sheet and the housing together is not particularly limited.

Examples of the cosmetic container member include containers for face cream, pack cream, foundation, and eyeshadow and examples include cosmetic containers in which the resin sheet of the present application has been attached, for example, by vacuum pressure molding, to a surface of a lid member of a known container for foundation (JP 2017-29608 A). By attaching the resin sheet, a cosmetic container imparted with a good tactile sensation can be achieved. As the material of the resin sheet to be attached, an olefin-based resin or a urethane-based elastomer is preferable. The method for attaching the resin sheet is not particularly limited.

Examples of the stationery member include book covers, notebook covers, pen case covers, etc. and for example, a book cover imparted with a good tactile sensation and waterproofing can be achieved by manufacturing a known book cover (for example, JP 2007-246122 A) using the sheet of the present invention. Moreover, the form of the book cover is not particularly limited. As the material of the sheet, an olefin-based resin or a urethane-based elastomer is preferable. The method for manufacturing using the resin sheet is not particularly limited.

Examples of lighting equipment members include lighting equipment for indoors or in vehicles and examples include lighting devices in which the resin sheet of the present invention has been attached, for example, by vacuum pressure molding, to a surface of a cover member of a known LED lighting device. By attaching the resin sheet, an LED lighting device imparted with a good tactile sensation and light diffusibility can be achieved. As the material of the resin sheet to be attached, an olefin-based resin or a fluorine-based resin is preferable. The method for attaching the resin sheet is not particularly limited.

Examples of the daily commodities members include restroom products, indoor mats, sheets for tables, etc. and examples include toilet devices in which the resin sheet of the present invention has been attached, for example, by vacuum pressure molding, to a surface of a seat member of the toilet device. By attaching the resin sheet, a toilet device with a seat imparted with a good tactile sensation can be achieved. As the material of the resin sheet to be attached, an olefin-based resin or a fluorine-based resin is preferable. The method for attaching the resin sheet is not particularly limited.

Furthermore, hair-like body sheets in which words or patterns are printed on the surface of the hair-like bodies with a general printing method (an offset printing method, a gravure printing method, a flexographic printing method, a screen printing method, foil stamping, etc.) can be manufactured and applied to the above use. The material of the resin sheet to be printed on is not particularly limited, but it is preferable that the printability with the ink used in printing be considered.

Moreover, a laminated body in which the resin sheet of the present invention is laminate molded (dry laminate molded or extrusion laminate molded) with a printed article on which words, a pattern, etc. are printed (such as paper or a metal thin film) or with a non-woven cloth, etc. can be manufactured, for example, a business card with a tactile sensation can be manufactured by laminate molding to the printing surface of the business card. The material of the resin sheet to be laminated is not particularly limited.

EXAMPLES

The present invention is explained in more detail below using examples and comparative examples, but the present invention is not at all limited by the details of the examples, etc.

The raw materials used in the examples, etc. are as follows.

(1) Hair-Like Bodies and Base Layer
(A-1) TPU (urethane-based elastomer) "XN2001: Polycarbonate-Based" (manufactured by TOSOH CORPORATION)
(A-2) TPU (urethane-based elastomer) "HD1085A: Polycarbonate-Based" (manufactured by BASF)
(A-3) TPU (urethane-based elastomer) "ET880: Polyether-Based" (manufactured by BASF)
(B) Linear low-density PE "Neozex 45200" (manufactured by Prime Polymer Co., Ltd.)
(C) Mold release agent masterbatch "Waxmaster V" (manufactured by BASF)
(2) Sealant Resin Layer
(D-1) Hydrogenated styrene-based thermoplastic elastomer "Tuftec M1943" (manufactured by Asahi Kasei Chemicals Corporation)
(D-2) Hydrogenated styrene-based thermoplastic elastomer "Tuftec P2000" (manufactured by Asahi Kasei Chemicals Corporation)
(3) Substrate Layer
(E-1) ABS "DENKA ABS GT-R-61A" (manufactured by Denka Company Limited)
(E-2) PC/ABS "IM 6011" (manufactured by Sumika Polycarbonate Ltd.)
(E-3) Linear low-density PE "Neozex 45200" (manufactured by Prime Polymer Co., Ltd.)
(E-4) HIPS "Toyo Styrol H850N" (manufactured by TOYO-STYRENE CO., LTD., butadiene content: 9.0 mass %)

(4) Commercially Available Sheet
(F-1) Artificial leather "Ultrasuede" (manufactured by TORAY)
(F-2) Felt "Feltace" (manufactured by AMBIC CO., LTD; wool: 60% rayon: 40%)
(F-3) PVC synthetic leather "HI LARGO" (manufactured by SINCOL)

The evaluation methods for the various characteristics of the resin sheets and the molded articles, in which the resin sheets were vacuum pressure molded manufactured, in the examples and comparative examples are as follows.

(1) Weather Resistance Test

For the raw thermoplastic resins of the hair-like bodies and the base layer, sheets of about 0.3-mm thickness were manufactured using a hot press machine and irradiated for 500 hours at a black panel temperature of 63±3° C. and an irradiation intensity of 60 W/m$^2$ using a xenon lamp-type accelerated weather resistance tester (Xenon Weather Meter, manufactured by Suga Test Instruments Co., Ltd.). A color difference (transmission method) ΔE of the sheet before and after the test was measured using a color-difference meter, Color Meter ZE6000 (manufactured by NIPPON DEN-SHOKU INDUSTRIES Co., Ltd.).

(2) Average Height of Hair-Like Bodies, Average Length of Hair-Like Bodies, Average Diameter of Hair-Like Bodies, Average Spacing Between Hair-Like Bodies, and Average Thickness of Base Layer The height (h) of the hair-like bodies, the diameter (d) of the hair-like bodies, the spacing (t) between the hairlike bodies, and the thickness of the base layer of the resin sheet were measured using a laser microscope (VK-X100, manufactured by KEYENCE CORPORATION). The measured samples were cross-sectional slices cut from the resin sheets at three random locations with a microtome. The height of 10 hair-like bodies was measured for each sample and an arithmetic mean value of the 30 measurements was used as the average height of the hair-like bodies. For the average diameter of the hair-like bodies, the diameter of 10 hair-like bodies of each sample was measured at mid-height (h/2) and an arithmetic mean value of the 30 measurements was used. For the average spacing between the hair-like bodies, the distance from the center of the root of one hair-like body to the center of the root of a neighboring hair-like body was measured at 10 locations of each sample and an arithmetic mean value of the 30 measurements was used. For the average thickness of the base layer, the thickness from the roots of the hair-like bodies to the other layer interface was measured at 10 locations of each sample and an arithmetic mean value of the 30 measurements was used.

(3) Coefficient of Friction (MIU)

A resin sheet 20 cm×20 cm in size was mounted on a test stand with the face to which hair-like body shapes had been added oriented upwards, and a coefficient of friction (MIU) of the sheet was measured using a texture tester, "KES-FB4-A Surface Tester (manufactured by KATO TECH CO., LTD.)", by moving a probe across the surface of the sample at a load of 25 gf and a speed of 1 mm/sec. under atmospheric conditions with a relative humidity of 50% at room temperature 23° C. Three measurements were made both in the mechanical direction and in the width direction (a total of six measurements), and the average value of all the data was rounded off to two decimal places and used as the coefficient of friction of the sheet. In addition, a standard friction block (fingerprint type) was used as the contact.

(4) Deviation of Coefficient of Friction (MMD)

A resin sheet 20 cm×20 cm in size was mounted on a test stand with the face to which hair-like body shapes had been added oriented upwards, and a deviation of the coefficient of friction (MMD) of the sheet was measured using a texture tester, "KES-FB4-A Surface Tester (manufactured by KATO TECH CO., LTD.)", by moving a probe across the surface of the sample at a load of 25 gf and a speed of 1 mm/sec. under atmospheric conditions with a relative humidity of 50% at room temperature 23° C. Three measurements were made both in the mechanical direction and in the width direction (a total of six measurements), and the average value of all the data was rounded off to three decimal places and used as the deviation of the coefficient of friction of the sheet. In addition, a standard friction block (fingerprint type) was used as the contact.

(5) Deviation of Surface Roughness (SMD)

A resin sheet 20 cm×20 cm in size was mounted on a test stand with the face to which hair-like body shapes had been added oriented upwards, and a deviation of roughness (SMD) of the sheet was measured using a texture tester, "KES-FB4-A Surface Tester (manufactured by KATO TECH CO., LTD.)", by moving a probe across the surface of the sample at a load of 10 gf and a speed of 1 mm/sec. under atmospheric conditions with a relative humidity of 50% at room temperature 23° C. Three measurements were made both in the mechanical direction and in the width direction (a total of six measurements), and the average value of all the data was rounded off to three decimal places and used as the deviation of roughness of the sheet. In addition, a piece of piano wire with a diameter of 0.5 mm was used as the contact.

(6) Good Tactile Sensation Sensory Evaluation

A sensory evaluation of the good tactile sensation was performed by having a total of 10 people, 5 men and 5 women, touch the resin sheets. Evaluation was made using specific tactile sensations (smoothness, moistness, etc.) when touching the resin sheet surface and the tactile sensation felt by the greatest number of people was made the tactile sensation of the resin sheet surface.

(7) Vacuum Pressure Molding

The resin sheets were heated in vacuum with a double-sided vacuum molding machine (NGF-0709-S, manufactured by Fu-Se Vacuum Forming) and then a molded article was manufactured by vacuum pressure molding the resin sheets to a surface of a smartphone cover prepared in an environment of atmospheric pressure. The sheets were heated at 80° C. for 120 seconds and stretched to 1.5 times at the most stretched location.

Examples 1, 2, and 4-8

A dry blend of a thermoplastic resin (A) and a mold release agent (C) for forming the hair-like bodies and the base layer was streamed from a 40 mm single-screw extruder and a thermoplastic resin (E) for forming the substrate layer was streamed from a 65-mm single-screw extruder to extrude a resin sheet with a T-die method. The extruded resin sheet was cast using a relief processed transfer roll on which a relief process had been performed with chromium oxide spraying and a laser engraving method and which was adjusted to 60-150° C. and a silicone-based rubber touch roll having a rubber hardness of 70 and adjusted to 10-90° C. and taken in at a line speed of 1-15 m/min. using a pinch roll. Resin sheets with the composition, the thickness, and the surface shape shown in Table 1 were thus produced.

Example 3

The dry blend of the thermoplastic resin (A) and the mold release agent (C) for forming the hair-like bodies and the base layer was streamed from a 40 mm single-screw extruder, a thermoplastic resin (D) for forming the sealant resin layer was streamed from a 40-mm single-screw extruder, and the thermoplastic resin (E) for forming the substrate layer was streamed from a 65-mm single-screw extruder to extrude a resin sheet with a T-die method using a feed block. The extruded resin sheet was cast using a relief processed transfer roll on which a relief process had been performed with chromium oxide spraying and a laser engraving method and which was adjusted to 60-150° C. and a silicone-based rubber touch roll having a rubber hardness of 70 and adjusted to 10-90° C. and taken in at a line speed of 1-15 m/min. using a pinch roll. Resin sheets with the composition, the thickness, and the surface shape shown in Table 1 were able to be thus produced.

Example 9

The dry blend of the thermoplastic resin (A) and the mold release agent (C) was streamed from a 40 mm single-screw extruder to extrude a resin sheet with a T-die method, and the extruded resin sheet was cast using a relief processed transfer roll on which a relief process had been performed with chromium oxide spraying and a laser engraving method and which was adjusted to 60-150° C. and a silicone-based rubber touch roll having a rubber hardness of 70 and adjusted to 10-90° C. and taken in at a line speed of 1-15 m/min. using a pinch roll. Resin sheets with the composition, the thickness, and the surface shape shown in Table 1 were thus produced.

Comparative Example 1

A resin sheet of the dry blend of the thermoplastic resin (A) and the mold release agent (C) was made using a hot press machine. Resin sheets with the composition, the thickness, and the surface shape shown in Table 1 were thus produced.

Comparative Examples 2-4

Commercially available sheets were used.
Evaluative testing of various characteristics was performed using the resin sheets obtained in the examples and comparative examples and the results are shown in Table 1.

TABLE 1

| | | Hair-like bodies and base layer | | | | | | Hair-like bodies | | |
|---|---|---|---|---|---|---|---|---|---|---|
| | | TPU (A-1) | TPU (A-2) | TPU (A-3) | LLDPE (B) | Mold release agent (C) | Weather resistance (color difference ΔE) | Average height, h (μm) | Average diameter, d (μm) | Average spacing, t (μm) |
| Example 1 | Composition (mass %) | 95 | — | — | — | 5 | 3 | 150 | 26 | 62 |
| | Thickness (μm) | 200 (base 50 + hair-like 150) | | | | | | | | |
| Example 2 | Composition (mass %) | 95 | — | — | — | 5 | 3 | 102 | 32 | 64 |
| | Thickness (μm) | 130 (base 50 + hair-like 100) | | | | | | | | |
| Example 3 | Composition (mass %) | 95 | — | — | — | 5 | 3 | 150 | 30 | 62 |
| | Thickness (μm) | 200 (base 50 + hair-like 150) | | | | | | | | |
| Example 4 | Composition (mass %) | — | 95 | — | — | 5 | 3 | 200 | 25 | 63 |
| | Thickness (μm) | 250 (base 50 + hair-like 200) | | | | | | | | |
| Example 5 | Composition (mass %) | — | 95 | — | — | 5 | 3 | 80 | 35 | 61 |
| | Thickness (μm) | 130 (base 50 + hair-like 80) | | | | | | | | |
| Example 6 | Composition (mass %) | — | 95 | — | — | 5 | 3 | 150 | 28 | 62 |
| | Thickness (μm) | 200 (base 50 + hair-like 150) | | | | | | | | |
| Example 7 | Composition (mass %) | — | 95 | — | — | 5 | 3 | 80 | 38 | 63 |
| | Thickness (μm) | 130 (base 50 + hair-like 80) | | | | | | | | |
| Example 8 | Composition (mass %) | — | — | 95 | — | 5 | 30 | 150 | 32 | 63 |
| | Thickness (μm) | 200 (base 50 + hair-like 150) | | | | | | | | |
| Example 9 | Composition (mass %) | — | — | — | 100 | — | 3 | 250 | 18 | 62 |
| | Thickness (μm) | 400 (base 150 + hair-like 250) | | | | | | | | |
| Comparative Example 1 | Composition (mass %) | — | — | 95 | — | 5 | 30 | — | — | — |
| | Thickness (μm) | 300 (no hair-like body formation) | | | | | | | | |
| Comparative Example 2 | Type | (F-1) Artificial leather | | | | | — | — | — | — |
| | Thickness (μm) | 900 | | | | | | | | |
| Comparative Example 3 | Type | (F-2) Felt | | | | | — | — | — | — |
| | Thickness (μm) | 900 | | | | | | | | |
| Comparative Example 4 | Type | (F-3) PVC synthetic leather | | | | | — | — | — | — |
| | Thickness (μm) | 900 | | | | | | | | |

| | | Sealant layer | | Substrate layer | | | | Physical Properties | | | | |
|---|---|---|---|---|---|---|---|---|---|---|---|---|
| | | Thermoplastic elastomer (D) | Thermoplastic elastomer (D) | ABS (E-1) | PC/ABS (E-2) | LLDPE (E-3) | PS (E-4) | MIU | MMD | SMD | MIU/ MMD | Good tactile sensation |
| Example 1 | Composition (mass %) | — | — | 100 | — | — | — | 0.78 | 0.018 | 0.459 | 43.3 | smooth, moist |
| | Thickness (μm) | — | — | | 350 | | | | | | | |
| Example 2 | Composition (mass %) | — | — | 100 | — | — | — | 0.75 | 0.015 | 0.490 | 50.0 | smooth, moist |
| | Thickness (μm) | — | — | | 350 | | | | | | | |
| Example 3 | Composition (mass %) | 50 | 50 | — | — | — | 100 | 0.88 | 0.020 | 0.250 | 44.0 | smooth, moist |
| | Thickness (μm) | | 50 | | | | 300 | | | | | |
| Example 4 | Composition (mass %) | — | — | 100 | — | — | — | 0.90 | 0.021 | 0.413 | 42.9 | smooth, moist |
| | Thickness (μm) | — | — | | 350 | | | | | | | |

TABLE 1-continued

| | | Hair-like bodies and base layer | | | | | Hair-like bodies | | | |
|---|---|---|---|---|---|---|---|---|---|---|
| | | TPU (A-1) | TPU (A-2) | TPU (A-3) | LLDPE (B) | Mold release agent (C) | Weather resistance (color difference ΔE) | Average height, h (μm) | Average diameter, d (μm) | Average spacing, t (μm) |
| Example 5 | Composition (mass %) Thickness (μm) | — | — | 100 350 | — | — | 0.75 | 0.015 | 0.490 | 50.0 | smooth, moist |
| Example 6 | Composition (mass %) Thickness (μm) | — | — | — | 100 350 | — | 0.76 | 0.018 | 0.570 | 42.2 | smooth, moist |
| Example 7 | Composition (mass %) Thickness (μm) | — | — | — | — | 100 350 | 0.68 | 0.015 | 0.338 | 45.3 | smooth, moist |
| Example 8 | Composition (mass %) Thickness (μm) | — | — | 100 350 | — | — | 0.85 | 0.022 | 0.450 | 38.6 | smooth, moist |
| Example 9 | Composition (mass %) Thickness (μm) | — | — | — | — | — | 0.80 | 0.022 | 0.202 | 36.4 | moist |
| Comparative Example 1 | Composition (mass %) Thickness (μm) | — | — | — | — | — | 2.70 | 0.041 | 0.212 | 65.9 | sticky |
| Comparative Example 2 | Type Thickness (μm) | — | — | — | — | — | 1.45 | 0.030 | 2.610 | 48.3 | rough, dry |
| Comparative Example 3 | Type Thickness (μm) | — | — | — | — | — | 1.18 | 0.020 | 2.920 | 59.0 | rough, dry |
| Comparative Example 4 | Type Thickness (μm) | — | — | — | — | — | 1.12 | 0.021 | 2.020 | 53.3 | rough |

The following is clear from the results shown in Table 1. All of the resin sheets of Examples 1-9 produced results satisfying the coefficient of friction, the deviation of the coefficient of friction, and the deviation of roughness, as measured according to KES, which are the basic physical properties used when evaluating good tactile sensation. In contrast, the resin sheets and the commercially available sheets of Comparative Examples 1-4 did not produce results that satisfied any of the coefficient of friction, the deviation of the coefficient of friction, and the deviation of roughness, as measured according to KES.

Moreover, the shapes of the resin sheets obtained in Examples 1-9 were observed using a field emission-type scanning electron microscope (FE-SEM, JEOL, Ltd., JSM-7001F).

It was observed from the scanning electron microscope images that the hair-like bodies extend in a fixed direction without tangling with one another. Moreover, the shapes of the hair-like bodies included those in which the cross-sectional area gradually shrinks with increasing distance from the base layer and those in which the cross-sectional area gradually shrinks and then once again increases when the shape terminates. Moreover, it was observed that the tip parts of the hair-like bodies in which the cross-sectional area gradually shrinks with increasing distance from the base layer and then once again increases when the shape terminates are bud-shaped or mushroom-shaped, and the bud-shaped or mushroom-shaped parts are partially hollow. It was observed that a better tactile sensation is expressed by having such a shape.

The present invention was described above using various embodiments, but it need not be mentioned that the technical scope of the present invention is not limited to the scope described in the above embodiments. It is clear to a person skilled in the art that it is possible to add various modifications or improvements to the above embodiments. Further, it is clear from the recitations of the patent claims that aspects in which such modifications or improvements are added are included in the technical scope of the present invention.

REFERENCE SIGNS LIST

1 Hair-like bodies and base layer
1a Base layer
1b Hair-like bodies
d Diameter of the hair-like bodies
h Height of the hair-like bodies
t Spacing between the hair-like bodies
2 Sealant resin layer
3 Substrate layer

The invention claimed is:

1. A resin sheet having elongated bodies arranged regularly on at least one surface of a base layer comprising a thermoplastic resin,
the surface with the elongated bodies having a coefficient of friction, as measured according to KES (MIU), of 0.5 or more and 1.0 or less,
a deviation of the coefficient of friction, as measured by KES (MMD), of 0.010 or more and 0.025 or less,
a deviation of roughness, as measured by KES (SMD), of 0.2 or more and 1.5 or less,
the surface with the elongated bodies has a ratio (MIU/MMD) of the coefficient of friction, as measured according to KES, and the deviation of the coefficient of friction, as measured according to KES, of 40 or more and less than 55,
the thermoplastic resin comprises a polycarbonate-based urethane-based elastomer,
an aspect ratio of the elongated bodies is from 2 to 20,
the coefficient of friction, as measured according to KES (MIU), was measured by mounting a resin sheet 20 cm×20 cm in size on a test stand with a face to which the elongated bodies have been added oriented upwards, and using a texture tester, by moving a probe across the surface of the resin sheet at a load of 25 gf and a speed of 1 mm/sec. under atmospheric conditions with a relative humidity of 50% at 23° C.,
the deviation of the coefficient of friction, as measured according to KES (MMD), was measured by mounting a resin sheet 20 cm×20 cm in size on a test stand with a face to which the elongated bodies have been added oriented upwards, and using a texture tester, by moving a probe across the surface of the resin sheet at a load of 25 gf and a speed of 1 mm/sec. under atmospheric conditions with a relative humidity of 50% at 23° C., and the deviation of roughness (SMD) was measured by mounting a resin sheet 20 cm×20 cm in size on a test stand with the face to which the elongated bodies have been added oriented upwards, and using a texture tester, by moving a probe across the surface of the resin sheet at a load of 10 gf and a speed of 1 mm/sec. under atmospheric conditions with a relative humidity of 50% at 23° C.

2. The resin sheet according to claim 1, wherein the elongated bodies have an average height of 30 μm or more and 500 μm or less, an average diameter of 1 μm or more and 50 μm or less, and an average spacing, between the elongated bodies, of 20 μm or more and 200 μm or less.

3. The resin sheet according to claim 1, wherein the deviation of roughness, as measured according to KES, is 0.22 or more and 1.0 or less.

4. The resin sheet according to claim 1, wherein the elongated bodies and the base layer have a color difference ΔE of 10 or less before and after testing upon 500 hours of irradiation at a black panel temperature of 63° C. and an irradiance of 60 W/m$^2$ using a xenon lamp-type accelerated weather resistance tester.

5. A molded article of the resin sheet according to claim 1.

6. The molded article according to claim 5, wherein the molded article is a stationery member.

7. The molded article according to claim 5, wherein the molded article is vacuum pressure molded on a surface of an automobile interior material, an electronic device, an electronic device cladding, a cosmetic container, or a container member.

* * * * *